(No Model.)

5 Sheets—Sheet 1.

J. B. HOWE.
HAT POUNCING MACHINE.

No. 490,788. Patented Jan. 31, 1893.

WITNESSES
C. M. Newman
A. J. Tanner

INVENTOR
John B. Howe
by his atty D. H. Hubbard (No Model.)  5 Sheets—Sheet 2.

J. B. HOWE.
HAT POUNCING MACHINE.

No. 490,788. Patented Jan. 31, 1893.

WITNESSES
C. M. Newman
A. J. Tanner

INVENTOR
John B. Howe
by his atty D. H. Hubbard (No Model.) 5 Sheets—Sheet 3.
J. B. HOWE.
HAT POUNCING MACHINE.
No. 490,788. Patented Jan. 31, 1893.
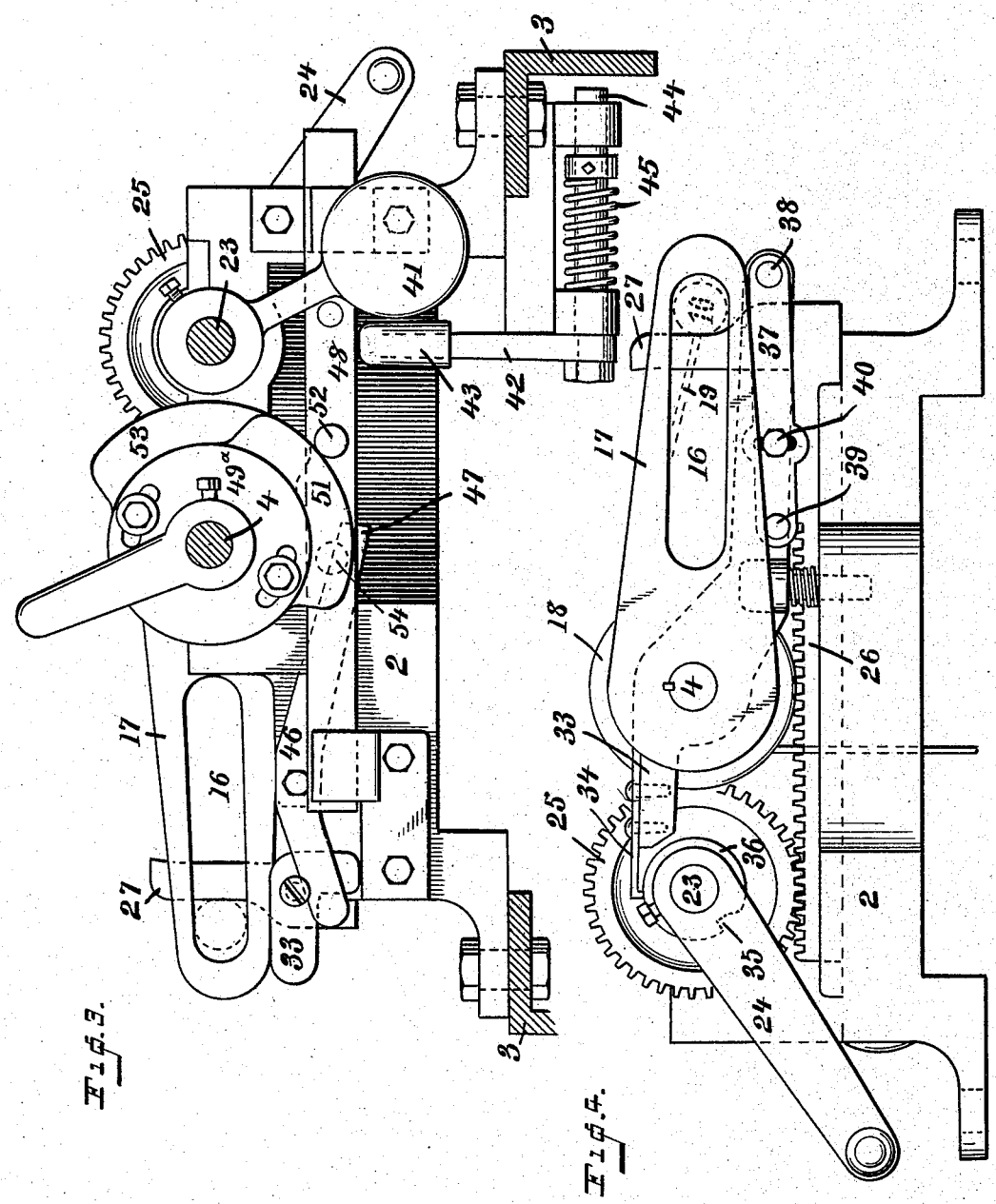
WITNESSES
C. M. Newman
A. J. Tanner
INVENTOR
John B. Howe
by his atty
O. H. Hubbard

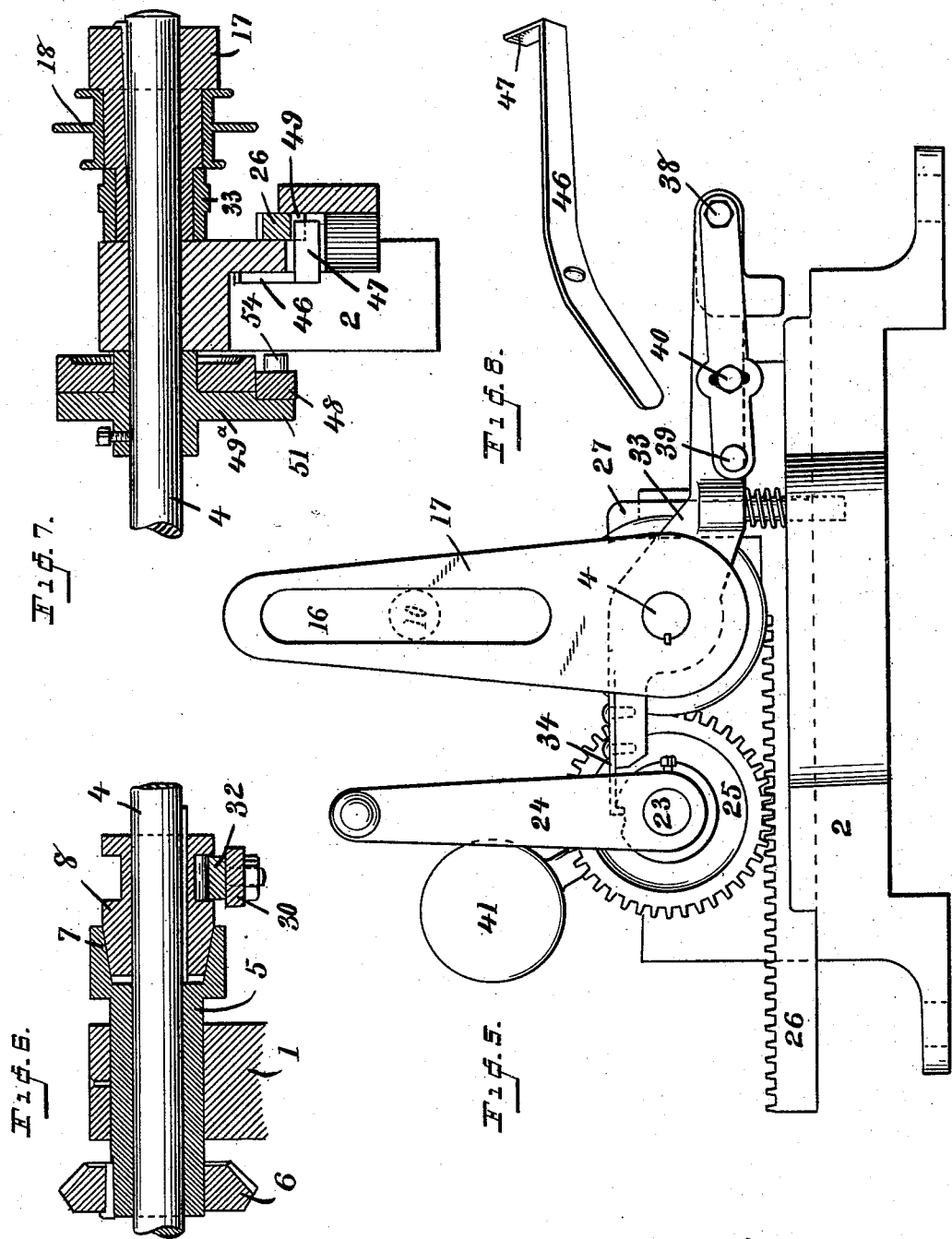

(No Model.) 5 Sheets—Sheet 5.
J. B. HOWE.
HAT POUNCING MACHINE.
No. 490,788. Patented Jan. 31, 1893.
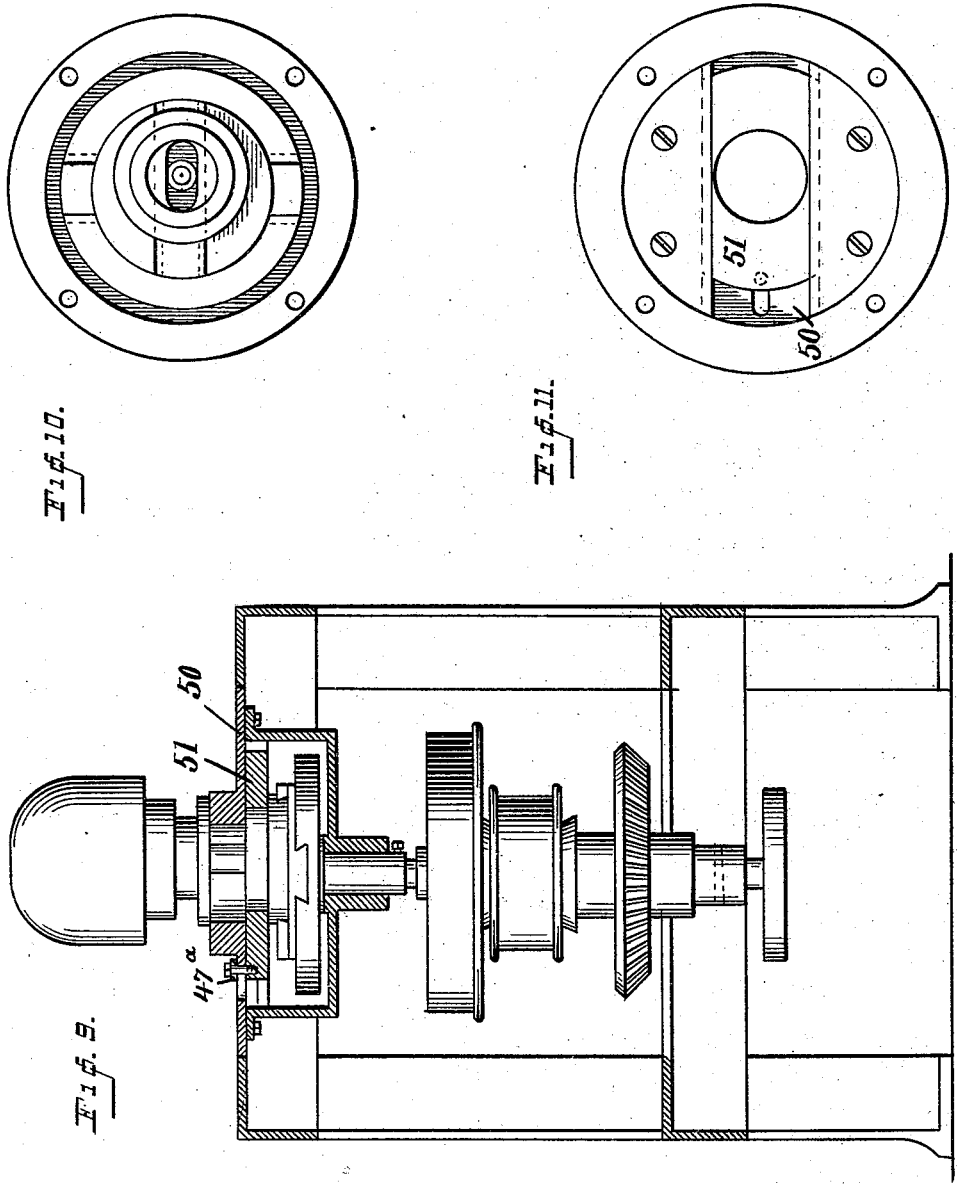
WITNESSES:
C. M. Newman,
A. J. Tanner.
INVENTOR:
John B. Howe,
BY D. H. Hubbard
atty.

UNITED STATES PATENT OFFICE.

JOHN B. HOWE, OF DANBURY, CONNECTICUT.

HAT-POUNCING MACHINE.

SPECIFICATION forming part of Letters Patent No. 490,788, dated January 31, 1893.

Application filed March 21, 1892. Serial No. 425,722. (No model.)

*To all whom it may concern:*

Be it known that I, JOHN B. HOWE, a citizen of the United States, residing at Danbury, in the county of Fairfield and State of Connecticut, have invented certain new and useful Improvements in Hat-Pouncing Machines; and I do hereby declare the following to be a full, clear, and exact description of the invention, such as will enable others skilled in the art to which it appertains to make and use the same.

This invention relates to certain new and useful improvements in hat pouncing machines, and has for its object to produce a machine of reasonably simple construction and of high efficiency in its operation on the hat.

In a certain application for United States Letters Patent Serial No. 391,892, filed by me May 7, 1891, and having for its subject matter a hat pouncing machine, I showed and described certain feeding mechanism whereby the pouncer head was caused to traverse the surface of the rotating hat, and after doing its work was removed automatically out of engagement therewith. This application embraces certain improvements in this feeding mechanism, and is for the purpose of simplifying it and rendering its action more positively certain.

With the ends hereinbefore set forth in view my present invention consists and resides in the construction and combination of elements hereinafter fully and in detail explained and then recited in the claims.

Figure 1:
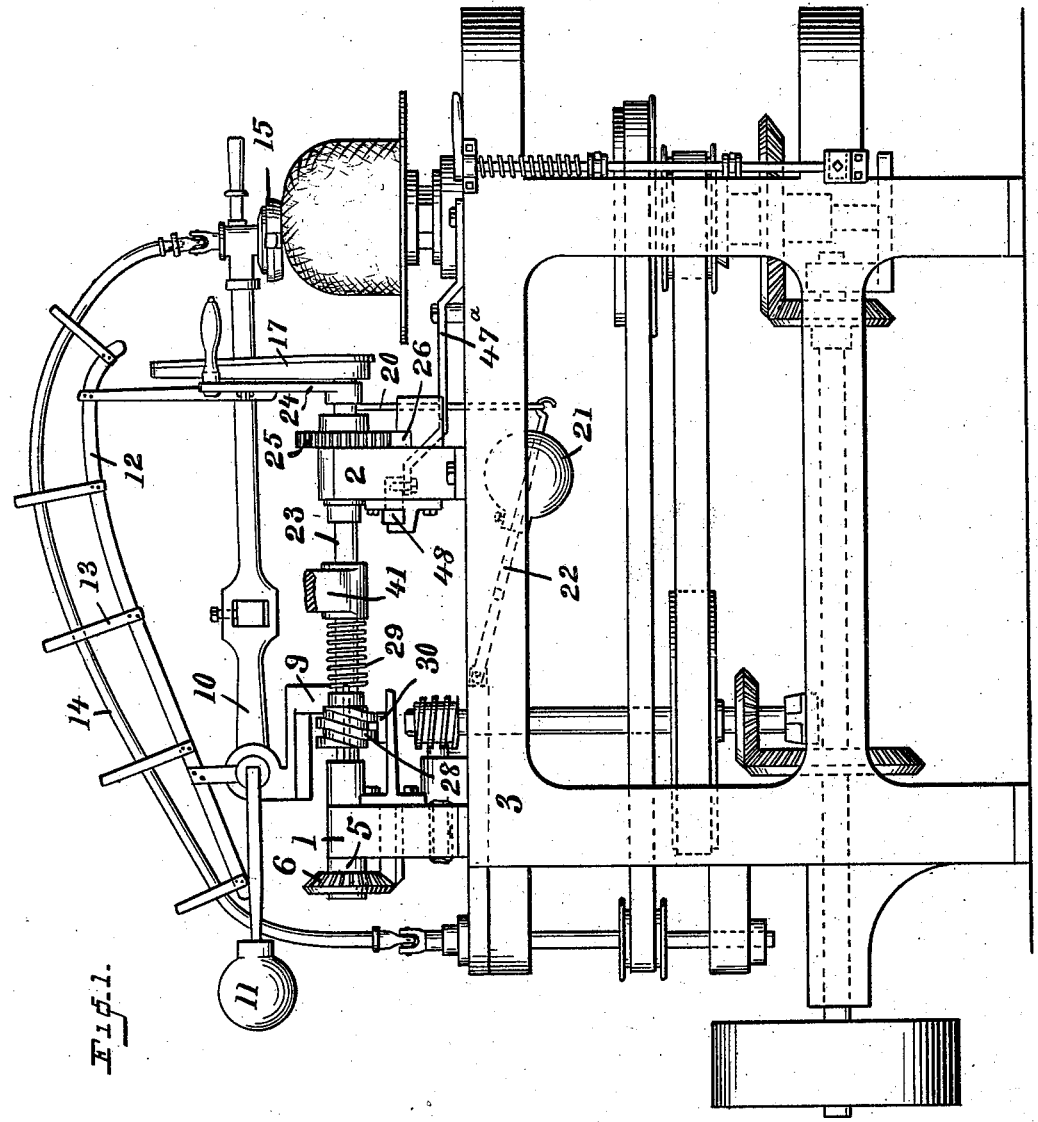
Figure 2:
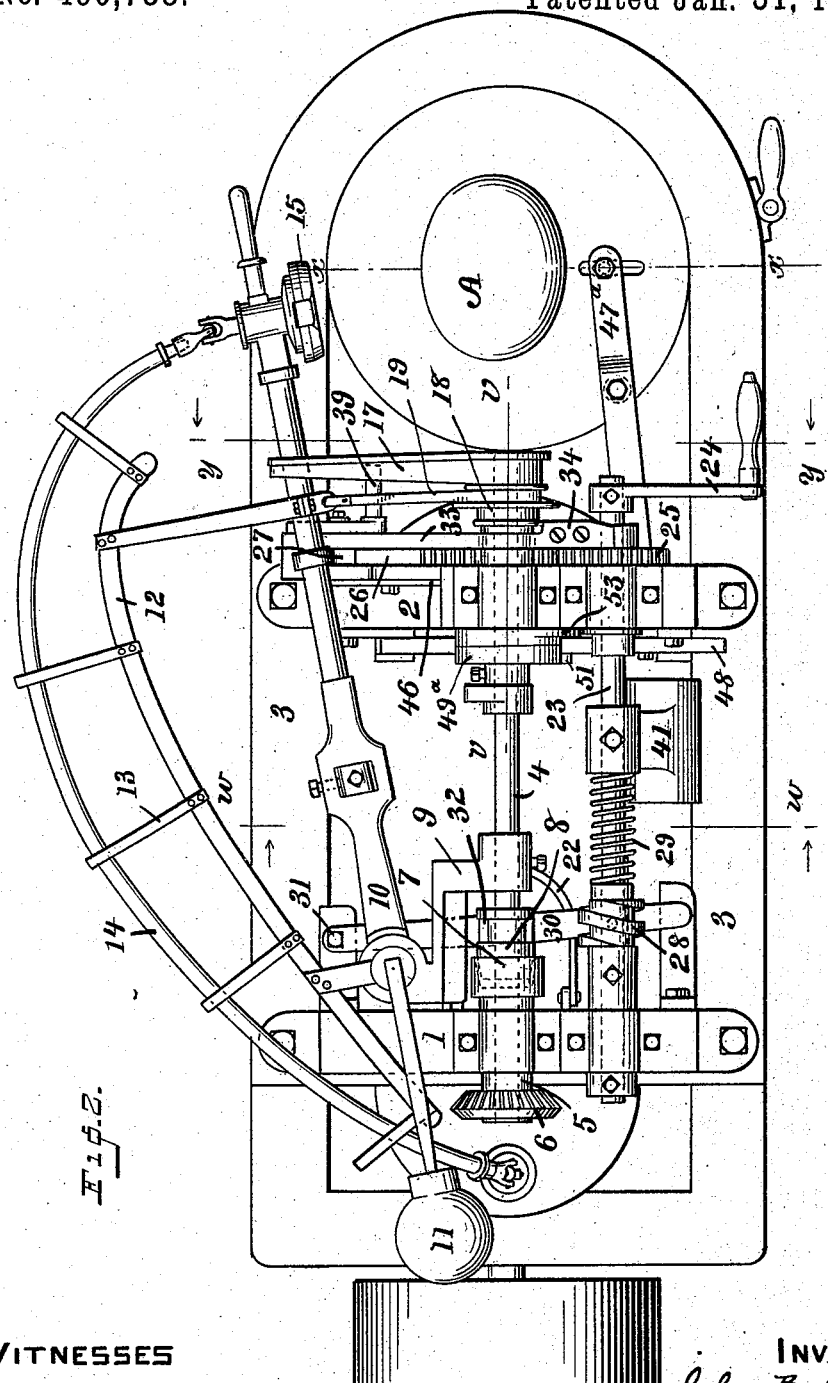

In order that those skilled in the art to which my invention appertains may fully understand its construction and method of operation, I will proceed to describe these in detail, reference being had to the accompanying drawings which form a part of this specification, and in which, Figure 1, is a side elevation, the parts being in position to commence the pouncing operation. Fig. 2, is a plan view showing the pouncing operation as completed and the pouncer withdrawn out of contact with the hat. Fig. 3, is a section on the line w—w of Fig. 2 with the parts in the position shown at said figure. Fig. 4, is a detail end view taken at the line y—y of Fig. 2. Fig. 5, is a view taken on the line y—y of Fig. 2 in the direction of the arrow, but showing the parts in the position illustrated by Fig. 1. Fig. 6, is a detail longitudinal section of the clutch mechanism shown at the left of Fig. 2. Fig. 7, is a detail longitudinal section on the line v—v of Fig. 2. Fig. 8, is a detail perspective of a locking lever shown at the left center of Fig. 3. Fig. 9, is a section on the line x—x of Fig. 2. Fig. 10, is a detail plan view showing the lateral shifting devices. Fig. 11, is an inverted plan view showing the casing and the slide therein contained.

The same numerals denote the same parts in each of the figures.

The mechanism by which the hat block is rotated and its speed changed, and also the means for driving the pouncer head are the same as those shown and described in my previous application above referred to, and need no detail description here, since they form no part of my present invention.

Journaled in suitable cross-bars 1 and 2 supported upon the main frame 3 of the machine, is the feeding shaft 4 by means of which the movement of the pouncer is effected. This shaft at its rear end passes through a sleeve 5, see enlarged detail Fig. 6, and the rear end of this sleeve bears a gear 6 which is driven with a constant motion by connections which are the same as, or substantially like those described in my previous application, though the derivation of the power for driving the sleeve and its gear is immaterial. The forward end of the sleeve 5 bears a tapered clutch hub 7 and this is complementary to a similar hub 8 splined to the shaft 4, whereby at certain times the sleeve may drive the shaft 4, and at certain other times may rotate idly with respect thereto. The shaft 4 bears an angular bracket 9 upon the end of which is fulcrumed a pouncer lever 10. The pouncer lever is counterbalanced by a weight 11, and is also provided with a rack or frame-work consisting of a bar 12 and loops 13 wherein is confined the flexible shaft 14, through which power is transmitted to the rotative pouncer head 15. The pouncer lever 10 a little back of the pouncer head passes through a slot 16 in a lever 17, as clearly appears at Figs. 3, 4 and 5, the parts being combined, substantially as shown in previous application above referred to, so that while the lever will draw the pouncer head over the surface of the hat crown, said lever may be withdrawn longitudinally of the slot to the position shown at Figs. 2 and 4, thereby removing the pouncer head out of operative contact. The lever 17 just referred to is firmly secured upon the end of the shaft 4, as by a key. The pouncer is normally kept in contact with the hat during the operation of the pouncing in the following manner. A double strap wheel 18 is journaled around the hub of the lever 17 immediately behind the latter. Secured to one-half of this wheel is a strap or cord 19 whose outer end is connected to the lever 10. On the other half of the strap wheel is fastened a strap 20, see Fig. 1, whose lower end is connected to a weight 21, said weight being mounted upon a hinged lever 22, although an ordinary weight attached to the strap would answer the purpose. The purpose of the construction shown is that the weight may be moved along the lever so that as it is nearer the outer end or nearer the fulcrum the pressure of the pouncer against the hat will be varied, and this is convenient, since it does away with a multiplicity of weights, and enables the pressure upon the pouncer to be very accurately adjusted.

Parallel with the shaft 4 is a shaft 23 provided at its outer end with a crank 24 and having secured thereon just inside the crank a gear wheel 25. This gear wheel meshes with the teeth of a straight sliding rack 26 supported in suitable ways beneath it, and the outer end of said rack is provided with an upwardly projecting post 27 which is shown in side elevation at Figs. 3, 4 and 5.

Upon the shaft 23 is splined a worm 28 having a very slight longitudinal movement, and kept in the position shown at Fig. 2 by means of a spring 29. This worm, through a pin or stud, operates a lever 30, which extends across the machine and is fulcrumed at 31, and which at its center engages the clutch hub 8 for the purpose of moving it into and out of engagement with the clutch hub 7, the spline connection between the shaft 4 and hub 8 permitting this to be done. The engagement between the lever 30 and the hub consists of a stud or projection on the lever taking into a groove in the hub, as appears at Fig. 6.

Around the hub of the lever 17, see Fig. 7, is fulcrumed a lever 33 whose forward end, as seen at Fig. 4, is provided with a hooked tooth 34, which tooth is adapted to take into a notch 35 on a disk 36, which latter is fastened upon the shaft 23 alongside the gear wheel 25. The other end of this lever 33 may be provided with a pin projecting outwardly into the plane of descent of the lever 17, but for the purposes of adjustment I prefer to attach to the lever 33 another lever 37 fulcrumed to the main lever at 38, having a pin 39 at its inner end and between the fulcrum and the pin a slot and bolt-adjusting device 40, whereby the pin 39 may be raised or lowered slightly so as to be engaged a little sooner or less soon by the lever. The shaft 23 also bears an outwardly extending weight 41 whose purpose will be presently explained. For the purpose of arresting this weight at the lower end of its fall I provide an abutment 42 preferably having a rubber block 43 thereon, the part 42 being attached to a slide rod 44 around which is coiled a spring 45.

Another feature of my machine consists in mechanism whereby the lathe spindle is caused to rotate the hat upon the hat block in an elliptical path, and to govern this movement automatically I have provided a connection between the hat block and the spindle which is the same in all essential particulars as the mechanism shown for this purpose in certain Letters Patent of the United States, No. 414,415, granted to me the 5th day of November, 1889, and particularly exhibited on Sheet 6 of the drawings, Figs. 14 to 21 inclusive. In that patent, however, the movement of the block was accomplished by means of the handle shown in those drawings as 84. In this machine I do away with the necessity for manual operation, by inserting the pivoted lever 47$^a$, which is acted upon through a longitudinally movable slide 48, which latter in its turn receives a gradual movement off the cam 49$^a$ upon the shaft 4. The outer end of this lever connects through the slotted plate 50 with a slide plate 51 which corresponds in all particulars to the part 45 in the Letters Patent above referred to. As this mechanism is so fully described and is also claimed in said patent I deem it unnecessary herein to incorporate any further description. The cam 49$^a$ imparts to the slide 48 a movement in one direction, while the pouncer lever is passing over the surface of the hat, and returns said slide and the lever 47$^a$ to their original position when the pouncer lever is carried back to the position shown at Fig. 1. This is done by means of the peculiar shape of the cam which is double-faced, as seen at Fig. 3, one face lying on one side of the slide, as at 51, and adapted to carry the slide, and the other face lying on the other side of the slide, as seen at 53, and adapted to carry the slide in the opposite direction by engagement with the stud 54, shown in Fig. 3 by dotted lines.

The operation of my invention is as follows. The machine is started with the lever 10 and its attached parts in the position shown at Fig. 1, that is, with the pouncer head on the top of the hat. This position of certain of the parts is also shown at Fig. 5, the weight 41 being raised. After the machine has been started the slow rotary movement of the shaft 4 through the lever 17 carries the pouncer lever downward in the arc of a circle toward the position shown at Fig. 2, the pouncer head being meanwhile held against the hat by the weight 21, as has heretofore been explained. When the lever 17 has reached the position shown at Fig. 2 it strikes the pin 39 and thereby tilts the lever 33 sufficiently to raise the hooked end of the part 34 out of engagement with the notch 35 in the disk 36. This releases shaft 23 and the weight 41, by falling from the position shown at Fig. 5 to that shown at Fig. 3, imparts to said shaft a quick rotation of about a quarter turn. At the time this release takes place the lever 10 has reached the outside of the post 27 which is carried by the rack 26. The rotation of the shaft 23 turns the gear, and this imparts to the rack a quick outward sliding movement which forces the lever 10 away from the hat to the position shown at Fig. 2, and raises the weight 21 against which this movement must necessarily take place. The quick turn of the shaft 23 also accomplishes another function. Through the worm 28 it moves the lever 30 in such manner as to disengage the two clutch faces shown at Fig. 6, by moving the hub 8 along its splined connection with the shaft 4, thereby freeing the last-named part from the sleeve 5, whereby it has theretofore been carried. When the finished hat has been taken off and another placed upon the rotating block, which is designated in Fig. 2 by A, the pouncer lever is first raised by hand to the position shown at Fig. 1. Then, by means of the crank 24, the shaft 23 is turned so as to raise the weight 41 to the position shown at Fig. 5, where it is retained by the hooked end of the part 34 until again tripped by the descending pouncer lever. This movement of shaft 23 through the crank, through the worm 28 and lever 30, restores the operative engagement between the clutch faces and thereby starts the shaft 4 through which the feeding movement is effected. It will of course be understood that the movement of the shaft 23 by means of the crank causes the gear 25 to withdraw the rack 26 from the position in which it is shown at Fig. 2 to that in which it appears at Fig. 5.

In order that the pouncer lever shall be raised to the position shown at Fig. 1 before the shaft 4 is engaged with the constantly rotating sleeve 5, I provide a locking device which consists of the pivoted lever 46, see Figs. 3 and 8, whose bent end, designated by 47, extends under the bottom of the rack. In the bottom of the rack I form a notch 49, see Fig. 7, into which the end of said lever may take when the parts are in the position shown at Figs. 3 and 4. The lever 46 not being fulcrumed at its center is overbalanced, and its end is normally below the plane of the rack, but when the lever 17 has reached the position shown at Fig. 3, it depresses the short end of the lever and raises its laterally bent end 47 into the notch in the bottom of the rack, see Figs. 7 and 3. This prevents any movement of the handle 24 until the lever 17 has been raised, but when this has been done the end of the lever 46 drops out of the notch and frees the rack so that by means of the crank the shaft 24 may be returned to the position shown at Figs. 1 and 5, as and for the purposes just described.

The operation of the mechanism described as consisting of the parts from 47 to 54 inclusive, is, as aforesaid, essentially the same as the operation of the same parts in my previous patent, with the exception that the gradual lateral movement of the hat block is effected by the cam 49 acting through the slide 48 on the lever 47 instead of by the hand of the operator.

I claim,

1. In a hat pouncing machine, the combination with the pouncer lever, of a slitted arm or lever embracing said pouncer lever and adapted to carry it over the surface of the hat, means as shown and described for the operation of said slitted lever, a sliding rack engaging said pouncer lever, a gear for actuating said rack, and means as described for imparting to said gear a quick rotative movement, substantially as and for the purpose set forth.

2. The combination with the shaft 4 of the lever 17 carried thereby, the pouncer lever engaged and operated by the lever 17, the straps and strap wheel connected to the pouncer lever, and the lever and weight substantially as described, whereby the pouncer is forced against the work.

3. In a machine of the character described, the combination with a pouncing lever, of the pouncer head, a flexible shaft whereby said pouncer head is driven, and a frame or rack carried by the pouncer lever for the support of said flexible shaft, said frame consisting of the bar 12 connected to the pouncer lever and the loops 13 projecting from the bar, the whole arranged substantially as set forth.

4. In a machine of the character described, the combination with the pouncer lever, of the shaft 4 and the feeding lever 17, the parallel weight-actuated shaft, a gear borne upon said shaft, a rack meshing with said gear, and a locking device in the path of the pouncer lever and adapted to be actuated thereby, whereby the shaft 23 is released, substantially as set forth.

5. The combination in a machine of the character described, with the shaft 4 and the pouncer lever carried thereby, of the constantly rotating sleeve 5, clutch mechanism interposed between the shaft 4 and sleeve 5, the weight-actuated shaft 23, and means connected to said shaft and to the clutch, whereby the faces of the latter are engaged or disengaged according to the position of the shaft 23, substantially as described.

6. The combination in a machine of the character described, of the following elements, viz. the pouncer lever and its pouncer, a feeding lever moving through the arc of a circle and engaging said pouncer lever, a longitudinally movable rack, a weight-actuated shaft, a gear upon said shaft engaging the rack, means for locking said shaft with the weight in its raised position, and a trip in the field of rotation of the pouncer lever whereby the weight-actuated shaft is released from its lock, substantially as described.

7. In a machine of the character described, the combination with the following elements, viz, the pouncer lever and its pouncer, the shaft 4 whereby said pouncer lever is carried, a constant source of power as the sleeve 5, a clutch interposed between the last-named part and the shaft 4, a weight-carrying shaft, a lever engaging the clutch, means carried by the weight-carrying shaft for moving the lever, and thereby engaging and disengaging the clutch, a lock for holding the shaft with its weight in a raised position, and means for releasing said shaft and permitting the weight to descend, substantially as described.

8. In a machine of the character described, the combination with the following elements, viz, the shaft 4 and means for driving the same, the pouncer lever 10 and the lever 17 operated by said shaft 4, the longitudinal sliding rack having means adapted at certain times to engage the pouncer lever, the shaft 23 bearing a weight, and a gear meshing with the rack, a locking lever 33 having one end engaging the shaft 23 and adapted to hold its weight in a raised position, and a trip mechanism actuated by the descent of the pouncer lever, whereby the shaft 23 is released, and the rack 26 actuated in the direction of its length.

9. In a machine of the character described, the combination of the shaft 4 and its engaging clutch, and a source of power, of the pouncer lever, the lever 17 connected therewith, the sliding rack, the shaft 23 having a gear engaging with said rack, a weight carried by said shaft 23 and adapted to operate the latter by gravity, a locking lever engaging the shaft 23 and actuated by the descent of the pouncer lever, a worm on the shaft 33, and a lever operated by said worm and engaging and adapted to control the position of the clutch upon the shaft 4, the whole arranged and adapted to operate substantially as and for the purpose set forth.

10. In a machine of the character described, the combination with the rotative hat block and means for permitting a change in its center of rotation, of the shaft 4, the cam 49$^a$ on said shaft, the lever 47 whereby the lateral movement of the block is effected, and a connection, substantially as described between said cam and lever.

In testimony whereof I affix my signature in presence of two witnesses.

JOHN B. HOWE.

Witnesses:
C. M. NEWMAN,
JOHN R. BOOTH.